Nov. 11, 1958
C. A. NOLF
2,859,869
SPIRAL EXTRUSION
Filed Aug. 31, 1955
2 Sheets-Sheet 1
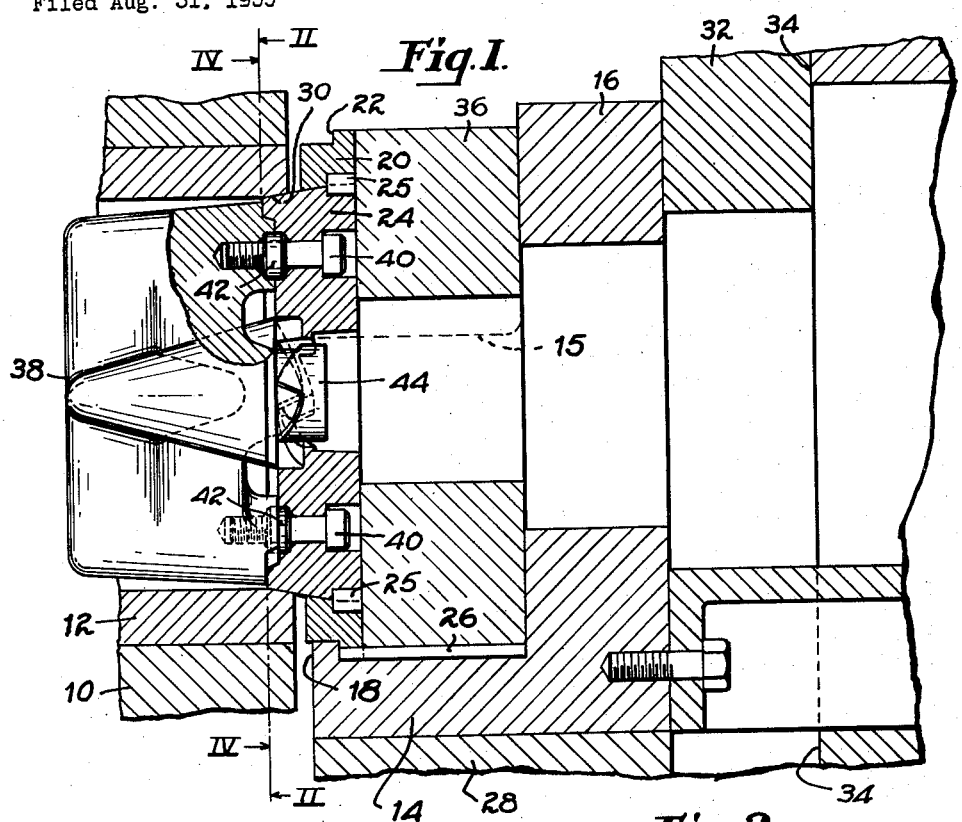
Fig. 1.
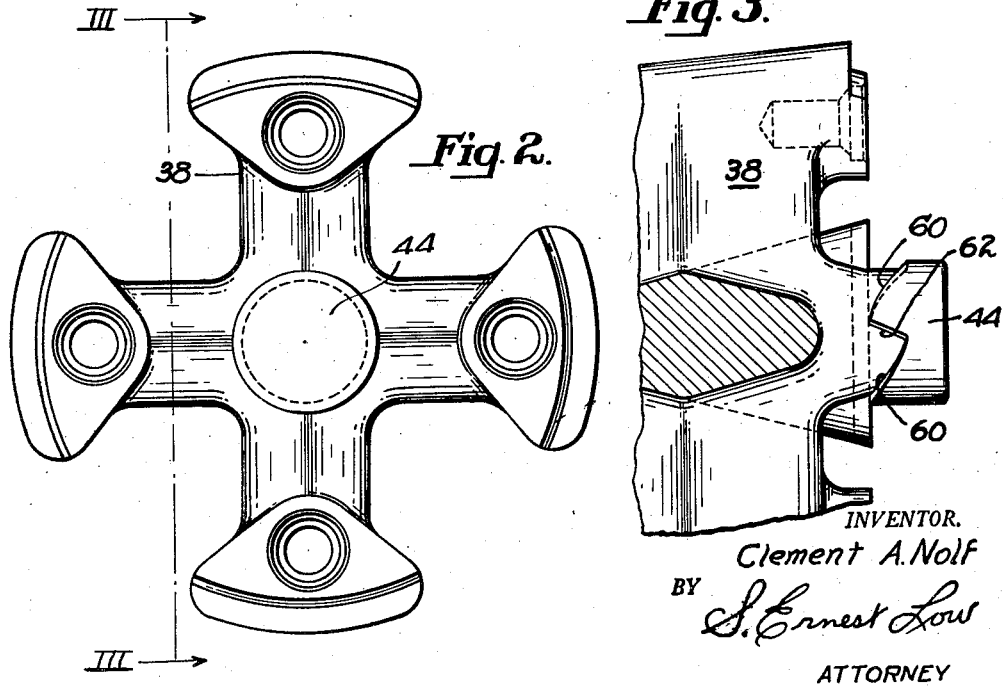
Fig. 2.
Fig. 3.
INVENTOR.
Clement A. Nolf
BY
S. Ernest Low
ATTORNEY Nov. 11, 1958    C. A. NOLF    2,859,869
SPIRAL EXTRUSION
Filed Aug. 31, 1955    2 Sheets-Sheet 2
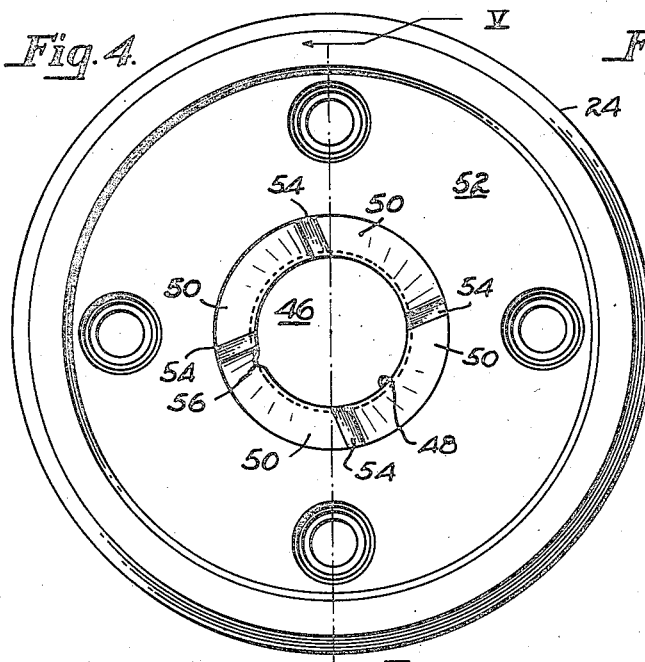
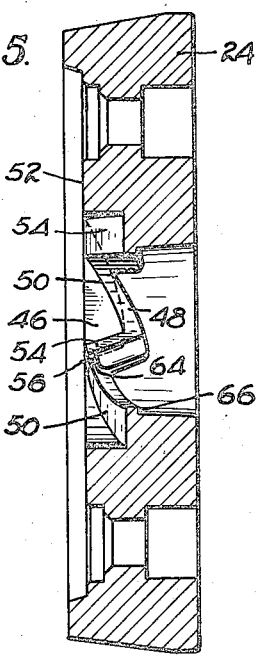
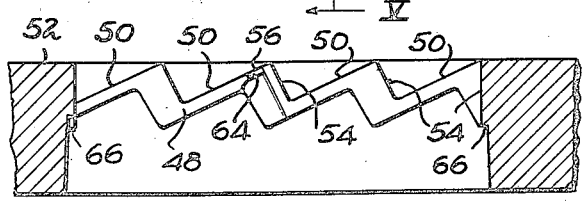
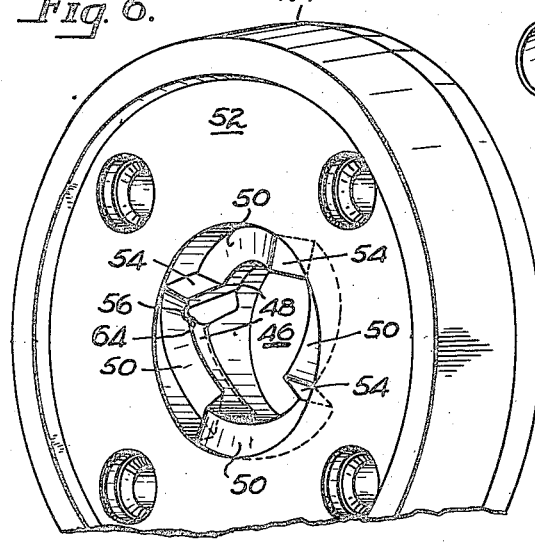
INVENTOR.
Clement A. Nolf
BY
*S. Ernest Low*
ATTORNEY United States Patent Office 2,859,869
Patented Nov. 11, 1958

2,859,869

SPIRAL EXTRUSION

Clement A. Nolf, New Kensington, Pa., assignor to Aluminum Company of America, Pittsburgh, Pa., a corporation of Pennsylvania Application August 31, 1955, Serial No. 531,662

1 Claim. (Cl. 207—5)

This invention relates in general to the art of extrusion and is more specifically addressed to tools and methods for producing extrusions which are helically or spirally twisted about their longitudinal axes during their production by extrusion.

It is a recognized engineering premise that material extruded through a die orifice will follow a course or direction which is substantially normal to a plane in which the die orifice is sunk or machined. It is also known to provide grooves, ridges or other forms of rifling on the bearing wall or land of an extrusion die, defining the exterior surface of an extrusion, for the express purpose of generating a spiral twist in the extruded section in the same general helical direction as the aforesaid rifling in the die bearing. The present invention represents a complete departure from the above-stated known spiral extrusion technique and practice in that it revolves around the development of a couple or co-acting couples within an extruded section during its extrusion which actually twists the same about its longitudinal axis as a direct result of a preselected angular disposition of the plane or planes defining a predominant portion of the entrance edge to the die orifice. By tilting the entrance edge plane or planes away from a plane normal to the longitudinal axis through a die orifice, one or more couples are exerted on the extrusion, with the result that a twisting force is applied, which axially spirals the extrusion about its longitudinal axis in coincidence with the longitudinal axis through the die orifice.

It is an object of the invention to provide an extrusion die structure for producing spiral or helicoidal extrusions.

It is another object of the invention to provide an extrusion die for producing spiral ribbed extrusions of solid and/or hollow cross-section.

A further object of the invention is to provide an extrusion die structure for producing interiorly and/or exteriorly spirally ribbed tubular members of generally circular cross-section.

Other objects of the invention will be understood by those versed in the art of extrusion on consideration of the following description, taken in the light of the illustrations, in which:

Fig. 1 represents a partial sectional elevational view through an extrusion apparatus billet cylinder and tool assembly, incorporating an extrusion die structure falling within the concept of the invention;

Fig. 2 represents a rear plan view of a mandrel supporting member of the extrusion die structure taken on the plane II—II of Fig. 1;

Fig. 3 represents a fragmentary sectional view taken on the plane III—III of Fig. 2;

Fig. 4 represents a front plan view of the female die block of the extrusion die structure taken on the plane IV—IV of Fig. 1;

Fig. 5 represents a sectional elevation taken on the plane of V—V of Fig. 4;

Fig. 6 represents a fragmentary perspective view of the female die block illustrated in plan view in Fig. 4;

Fig. 7 represents a developed view of the die bearing or land incorporated in the female die block of Figs. 4, 5 and 6; and Fig. 8 represents in perspective view a tubular product produced in the extrusion apparatus of Fig. 1.

In general terms, the invention is directed to an extrusion die machined or otherwise formed from a block of tool steel, or the like, to provide a die bearing or land surrounding an orifice therethrough defining the exterior boundary or boundaries of a member or section to be extruded, the entrance edge to the orifice being predominantly formed by one or more planes angularly disposed in the same general direction in respect to the longitudinal axis through the die orifice. In the case of a spiral extrusion or extruded member of circular or generally circular cross-section, the entrance edge to the die orifice defining the same may lie in a single helical curve of some preselected helix angle, the complement of which will be substantially equal to the angle of the helix or spiral produced in the member expressed or extruded through the die orifice. Furthermore, and in accordance with the teaching of the invention, the entrance edge to a die orifice for producing helicoidally spiraled or twisted extrusions may consist of a plurality of inclined planes. It is, however, essential that the inclined planes be unidirectional, as viewed perimetrically around, a predominantly major portion of the boundary or boundaries defining the entrance edge to the die orifice, and that the angle or angles of inclination of the planes be selected substantially the complement of the helix angle of the spiral or twist desired in the extruded member produced by the die.

Referring now to the drawings, where a production extrusion apparatus has been illustrated, 10 represents a billet container or cylinder for receiving and confining material, such as a heated metal billet or the like, to be extruded. The cylinder is normally and preferably provided with a suitable liner 12 which is shrunk fit, or otherwise secured within the interior bore of the cylinder. A ram not shown is employed and is adapted to enter the liner 12 at the front or entrance end thereof for exerting pressure against the material confined therein during an extrusion operation. A tool assembly is supported adjacent the opposite end of the liner 12 from that which admits the ram and serves to seal the otherwise open rear or discharge end of the liner, except for an extrusion die structure to be later described and through which the material to be extruded is expressed in a direction left to right, as viewed in Fig. 1.

The tool assembly preferably comprises a tool container 14, constructed in the form of an open-top, semi-circular channel housing 15 having an integral annular body portion 16 at one end thereof and an inwardly turned flange 18 at its opposite, open, semi-circular channel portion end. A die holder or ring 20, provided with an outwardly extending annular flange or shoulder 22, encircles and supports a female extrusion die block or member 24 which is received within the tool container 14 with the outwardly extending, integral flange 22 in abutting relationship with the inwardly extending flange 18 on the tool container 14, a key or keys 25 registering and securing the female die 24 within its tool ring 20 and a key 26 serving a similar purpose in respect to the die ring 20 and tool container 14.

The tool container 14 is preferably received within a rigid portion of the extrusion press, such as the front platen 28 thereof with which it is associated. The tool container 14 is also preferably slidably mounted for reciprocal and translatory movement within the front platen 28 into sealing engagement of the female extrusion die block 24 on a peripherally chamfered surface 30 at the discharge end of the liner 12 and outwardly away therefrom (to the right as viewed in Fig. 1) to bring the tool assembly beneath a normally employed shearing device incorporated in the extrusion press. A locking plate 32 is provided for reciprocal movement into and out of engagement with the rear surface 34 of a slot in the platen 28 and the rear end flat surface of the annular flange 16 of the tool container 14. The aforementioned key 26 is preferably of sufficient length to extend into a registering key way provided in the lower peripheral surface of a filler block or blocks 36 positioned between the co-planar rear faces of the female die 24 and tool ring 20 and front face of the tool container annular flange 16 to assure alignment of the same with the associated assembled elements within the tool container 14. It will be observed that the filler block or blocks 36 and associated die 24 are separately removable through the top open surface of the tool container 14, which permits replacement of an extrusion die as desired.

An extrusion die structure illustrative of the invention includes the aforementioned female die block 24, which is supported entirely within the aforementioned tool ring 20, and may have associated therewith a male die or bridge member 38 secured to its front face, as by attaching bolts 40 and centralizing collars 42. The male die member 38 may be constructed in the form of a bridge structure of generally cruciform shape provided with an extending mandrel member 44, integrally or unitarily attached to the rear face of the male die 38, in registry with an aperture 46 in the female die block 24. The male die member or mandrel-carrying member may also be constructed in the form of a cylindrical block provided with passages therethrough terminating adjacent the entrance face to the female die orifice. It will be understood that, regardless of specific structure, a tool assembly incorporating female die block 24 and mandrel 44 permits manufacture of tubular extrusions.

The crux of the invention lies in the construction and form of the die orifice 46 through the female die block 24, regardless of whether the mandrel 44 is employed therewith. The orifice 46, shown as generally circular in cross-section for purposes of illustration and not as limiting the scope of the invention, defines the exterior boundary or circumferential periphery of the section to be extruded by its wall bearing or land 48, which is usually substantially parallel to the longitudinal central axis through the orifice 46. However, in some circumstances the bearing or land 48 may be slightly choked or tapered to reduce the die orifice in the direction of flow therethrough, and/or a small radius may be employed at the entrance to the land 48.

The entrance edge to the orifice 46 is significantly formed by the intersection of one or more planes 50 perimetrically or circumferentially, unidirectionally and angularly disposed in respect to the plane of the front surface 52 of the die block 24, regardless of the aforementioned choked or radiused entrance to the die orifice. The plane 52 is normal to the longitudinal axis through the orifice 46, and in the preferred practice of the invention, is also substantially normal to the bearing wall 48. It will be observed that the inclined planes 50 preferably extend radially outwardly away from the bearing wall 48 and that their intersection with the bearing wall constitutes the predominant portion or length of the entrance edge circumference to the die orifice, connecting planes 54, forming shoulders between the lowest and highest elevations of the inclined planes 50, constituting a relatively smaller portion of the entrance edge circumference to the die orifice 46. It is to be further observed that the inclined planes 50 also all slope in the same general direction, as viewed from the entrance towards the discharge side of the die orifice 46, in defining the predominant entrance edge circumference of the die orifice.

The developed sectional view illustrated in Fig. 7 shows the construction and related surfaces defining the die orifice 46 to best advantage. Therein the inclined planes 50 (four in number in the specific illustration) are equal in length and slope unidirectionally away from and into the front plane face 52 of the die 24, the upper and lower ends of adjacent planes 50 being joined by the planes 54 to provide a contiguous entrance edge to the orifice 46 of the die.

If desired, a rib-forming groove 56 may be machined or otherwise formed in the bearing wall 48 of the die orifice 46. This groove may be located at any position in the bearing wall 48. The presence of the groove 56 coupled with the use of the mandrel 44, was employed in the extrusion of the tubular product of Fig. 8 having an integral exterior rib 58. It will be understood, however, that the groove 56 is not the effective element in the die orifice 46 imparting the spiral twist about the longitudinal axis of the product expressed through the die, the groove 56 merely serving to impart the configuration or cross-sectional shape to the rib.

The female die orifice 46 has been employed in the spiral extrusion of tubular and solid extrusions. Employing the mandrel 44, as illustrated in Figs. 1, 2 and 3, the protruding end thereof is preferably formed with surfaces 60 and 62 substantially similar in direction and angular disposition to the aforementioned surfaces 50 and 54, respectively. If desired, a groove of desired configuration could also be provided in the mandrel head 44 for producing a tubular spiral extrusion having a rib integrally formed on the interior surface thereof. In this connection, the groove 56 whether present in the die orifice bearing wall 48 or in the head 44 of the mandrel, or in both members, need only require a relatively short bearing 64 and be thereafter immediately relieved on the discharge side of the die bearing 48.

It has been found through practical experience gained in the use of extrusion dies made in accordance with the invention that the axial length of the bearing land 48 defining the die orifice 46 should preferably be shorter over a substantial portion of the length of the inclined planes 50 (Fig. 7) than its axial length subtending the planes 54. This is primarily a matter of tool design and maintenance, the axial length of any extrusion die bearing or land being normally selected to insure a minimum of frictional resistance to the flow of the material confined thereby during extrusion, while providing a bearing or wall surface that can be accurately machined and ground in its initial formation and subsequent maintenance. The die illustrated and described herein has proved entirely satisfactory in both of these respects and its geometric symmetry and similar angular relationship of the planes 50 and 54 in respect to the entrance and discharge faces of the die block 24 has permitted the use of standard commercial die sinking equipment and practices in its manufacture. As in all extrusion dies, the die orifice is preferably relieved at 66 along the discharge edge of the bearing wall or land 48.

Although the planes 50 and 54, defining the entrance edge to the female die orifice, have been illustrated as forming 90° angles at their points of intersection, other angles of intersection may be employed if desired so long as the length of each of the planes 50 is greater than that of each of the planes 54 to provide the controlling twisting couples on the section being extruded. It is, however, a significant feature of the invention that the inclined planes 50 constitute more than fifty percent of the length of the perimeter or circumference of the extruded section to be fabricated. For example, if the lengths of the planes 50 and 54 in the illustrations each defined or enclosed fifty percent of the cross-section of an extruded member, all of the planes would be of equal length. This would result in the production of a non-axially spiraled or twisted extrusion. It is the perimetrical length predominance of unidirectional inclined planes, such as the planes 50, which produces the aforementioned moments or couples imparting the twist or spiral in the extruded product, with the increased axial length of the bearing wall subtending the planes 54 further assisting in the applied couples.

The extrusion dies and practice of the invention are not limited to circular or generally circular extrusions. For example, the developed die bearing or land illustrated in Fig. 7 could be employed to enclose or define a die orifice for an extrusion of square or rectangular cross-section, each of the four sides of the orifice being defined by a bearing or land 48 the entrance edge to which is formed by one of the four inclined planes 50. Extruded sections combining curvilinear and chordal or tangential outlines enclosing or defining their cross-sections can also be spirally extruded so long as the entrance edges to the bearing or land defining the die orifice therefor are unidirectionally sloped for a predominant portion of their perimetrical length to develop the required couples exerting axial twisting of the extrusion.

What is claimed is:

An extrusion die comprising a die block having an aperture therethrough defining the extrusion opening, said aperture defined by a bore of the cross-sectional shape of the extrusion desired and a counterbore on the entrance side of said die defining an annular ledge medially of said aperture, said counterbore being non-uniform in its extent in the direction of the aperture axis to create a plurality of uniform major ledge sections each sloping from the entrance side of said aperture to the exit side thereof and said sections being joined by minor ledge sections extending in the opposite direction.

References Cited in the file of this patent

UNITED STATES PATENTS

| | | |
|---|---|---|
| 2,388,558 | Loewy | Nov. 6, 1945 |
| 2,422,994 | Taylor | June 24, 1947 |
| 2,461,640 | Hallberg | Feb. 15, 1949 |
| 2,723,028 | Carter | Nov. 8, 1955 |

FOREIGN PATENTS

| | | |
|---|---|---|
| 651,091 | Great Britain | Mar. 14, 1951 |
| 898,883 | Germany | Dec. 7, 1953 |